US00RE35271E

United States Patent [19]

Fisk et al.

[11] E Patent Number: Re. 35,271

[45] Reissued Date of Patent: Jun. 11, 1996

[54] PIPE BURSTING AND REPLACEMENT APPARATUS

[75] Inventors: Allan T. Fisk, Needham; David I. Freed, Sudbury; Thomas H. Mann, Littleton, all of Mass.

[73] Assignee: Consolidated Edison Company of New York, Inc., New York, N.Y.

[21] Appl. No.: 1,050

[22] Filed: Jan. 6, 1993

Related U.S. Patent Documents

Reissue of:

[64] Patent No.: 4,983,071
Issued: Jan. 8, 1991
Appl. No.: 524,231
Filed: May 15, 1990

[51] Int. Cl.[6] ..... F16L 1/00; F16L 55/18

[52] U.S. Cl. ..... 405/154; 30/92.5; 166/55.2; 166/55.7; 138/97

[58] Field of Search ..... 405/154, 156, 405/184; 30/92.5; 166/55.2, 55.3, 55.7; 138/97

[56] References Cited

U.S. PATENT DOCUMENTS

| | | | |
|---|---|---|---|
| 2,983,042 | 5/1961 | Frantz et al. | 30/92.5 |
| 3,181,302 | 5/1965 | Lindsay | 405/156 |
| 3,602,263 | 8/1971 | Bremner | 138/97 |
| 4,106,561 | 8/1978 | Jerome et al. | 166/55.2 |
| 4,505,302 | 3/1985 | Streatfield et al. | 405/156 X |
| 4,507,019 | 3/1985 | Thompson | 405/154 |
| 4,634,313 | 1/1987 | Robbins | 405/184 |
| 4,637,756 | 1/1987 | Boles | 405/184 |
| 4,648,746 | 3/1987 | Abinett | 405/184 |
| 4,674,914 | 6/1987 | Wayman et al. | 405/154 |
| 4,693,404 | 9/1987 | Wayman et al. | 405/156 X |
| 4,720,211 | 1/1988 | Streatfield et al. | 405/154 |
| 4,732,222 | 3/1988 | Schmidt | 405/184 X |
| 4,738,565 | 4/1988 | Streatfield et al. | 405/184 X |
| 4,903,406 | 2/1990 | Schosek et al. | 405/156 X |
| 4,925,344 | 5/1990 | Peres | 405/184 |
| 5,098,225 | 3/1992 | Rockower et al. | 405/156 |
| 5,171,106 | 12/1992 | Rockower et al. | 405/156 |

FOREIGN PATENT DOCUMENTS

| | | | |
|---|---|---|---|
| 94694 | 11/1983 | European Pat. Off. | 405/154 |
| 3800869 | 1/1989 | Germany | 405/154 |
| 266185 | 10/1990 | Japan | 405/154 |
| 2139938 | 11/1984 | United Kingdom | 405/184 |

*Primary Examiner*—Dennis L. Taylor
*Attorney, Agent, or Firm*—Brooks Haidt Haffner & Delahunty

[57] ABSTRACT

Tool for slitting and laterally expanding underground steel gas mains and inserting replacement plastic piping into the spread apart pipeline has a forward end cylindrical portion mounting a single, rearwardly angled blade to make only one line of cut, and a conical pipe spreader portion at its rearward end. The conical spreader portion is eccentrically disposed with respect to the forward end cylindrical portion. A single roller type pipe slitter aligned with the fixed blade may be mounted on a removable extension of the forward end cylindrical portion, to initially groove and weaken the pipe along the intended line of cut. A pneumatically operated impact ram is attached to the rearward end of the tool, as is the leading end of the replacement piping. A wire cable pulls the tool through the underground pipe, thereby grooving, slitting and laterally expanding the pipe. The spacing of the roller slitter in advance of the fixed knife blade is dimensionally related to the length of any coupling or clamp as may be anticipated along the line of cut, and the spacing distance of the fixed knife blade forwardly of the conical spreader portion is related to the cone angle of the latter to increase hoop tension immediately in front of the fixed blade as the cutting proceeds.

21 Claims, 5 Drawing Sheets

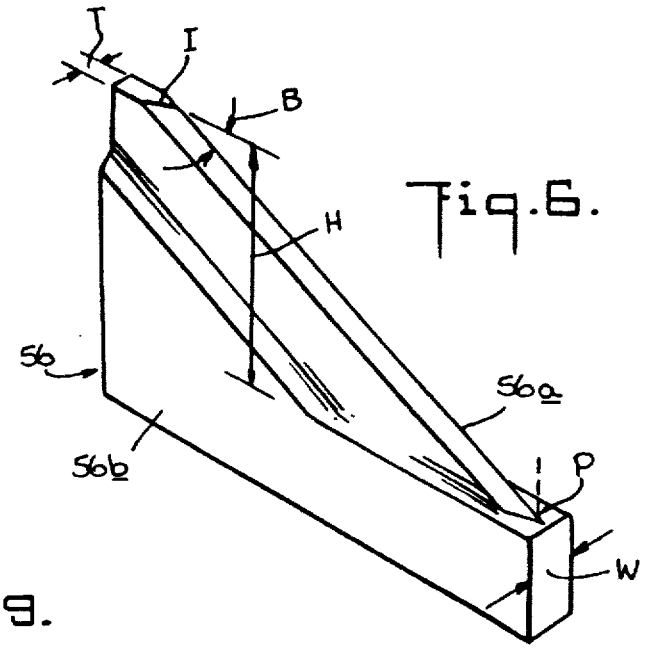
Fig. 6.
Fig. 9.
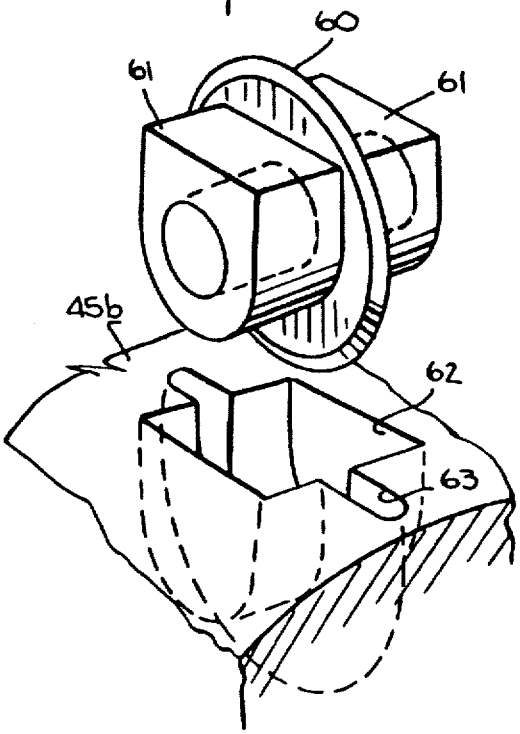
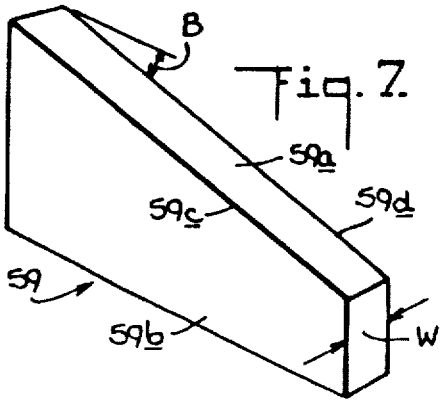
Fig. 7.
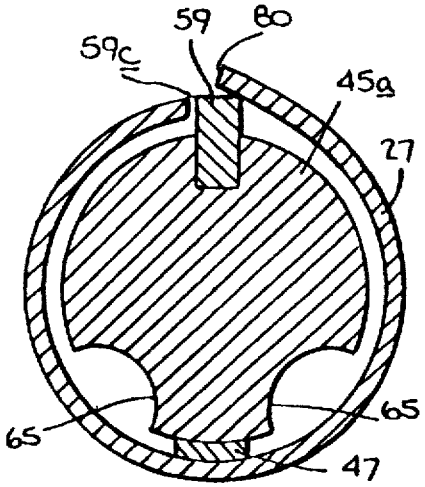
Fig. 8.

PIPE BURSTING AND REPLACEMENT APPARATUS

Matter enclosed in heavy brackets [ ] appears in the original patent but forms no part of this reissue specification; matter printed in italics indicates the additions made by reissue.

FIELD OF THE INVENTION

This invention relates to techniques for removal and replacement of underground pipelines, such as gas mains, service lines and the like. More particularly, the invention relates to apparatus and methods for bursting open and thereby effectively removing such existing but deteriorated underground steel pipelines, while concurrently feeding replacement piping into the pipe tunnel thereby created.

BACKGROUND OF THE INVENTION AND THE PRIOR ART

Although the invention may have other uses such as in the replacement of underground steel conduits of different size and having a variety of uses, the invention was made and will therefore be described in connection with devising an effective manner of removal of steel gaslines extending under paved roads and streets, particularly 4" diameter natural gas mains, and replacing of the gasline with plastic piping.

As such underground steel gaslines age, they deteriorate and begin to leak. Apart from inherent safety considerations, the repair and eventual replacement of such deteriorated lines is expensive and disruptive of normal street activity taking place thereabove. Expense can be significantly reduced by replacing the steel gas main with plastic pipe of the same size but, still, the steel pipe must first be effectively removed. In the past, street excavation and trenching along the length of the deteriorated steel piping has been necessary. It is intended by the present invention to avoid such trenching and extensive excavation when removing the old pipe.

A successful alternative to such trenching and excavating has been devised in connection with the removal of cast iron pipelines, this technique being known as "pipe bursting". The underground pipe is broken apart in situ using a pipe bursting tool pulled or pushed therethrough, the tool also incorporating a spreader which pushes the fragmented pipe remains radially outward into the surrounding soil so that the pipe is effectively, though not actually removed to make way for the replacement pipe. The replacement plastic pipe or, alternatively, a larger diameter plastic pipe liner within which the replacement pipe will be received, is usually attached to the pipe bursting tool so that it is pulled into place as the old pipe is removed. For example, see the impact ram boring tools of U.S. Pat. No. 4,505,302 (Streatfield et al.) and U.S. Pat. No. 4,732,222 (Schmidt) which employ pneumatically actuated, so-called "impact moles" of larger diameter than the cast iron pipe to be broken and having radially projecting angular blades which initially impact and cut into, and break the pipe as the mole is pulled and hammered therethrough. Similar disclosures are found in U.S. Pat. Nos. 4,720,211 (Streatfield et al), 4,738,565 (Strutfield et al), and 4,674,914 (Wayman et al).

However, these conventional percussive pipe breaker devices, though successful in replacing cast iron mains, have thus far not been successfully adapted for similar removal of steel gas mains, especially those which have all or some of their pipe sections joined using conventional, so-called Dresser couplings. The reason is that steel pipe has greater hoop strength than does cast iron, is more ductile, and therefore does not shatter and fragment as does cast iron. Even the chain of alternately upward and downward projecting pipe cutter wheels followed by a concentric conical spreader for cutting and separating the pipe into two halves as described in U.S. Pat. No. 3,181,302 (Lindsay) will not remove steel pipe in an entirely satisfactory manner, especially where local reinforcement is provided at the pipe joints by the very formidable Dresser couplings. Other possible techniques are known, such as downhole motors, sawblades, plasma cutters and lasers. However, in addition to their inabilities to satisfactorily perform the desired bursting function in steel pipe as aforesaid, all appear to be unduly complicated in construction, or expensive, or require very high power, or are difficult to operate or maintain. Thus, the task of cutting longitudinally all the way through such steel pipe would be extremely difficult using currently known hardware and methods.

BRIEF DESCRIPTION OF THE INVENTION

Although it may have other uses, the present invention provides a steel pipeline bursting and plastic liner insertion system for replacing gas mains without the high cost of excavation and disruption of street activity, and which avoids the aforementioned difficulties of previous systems if attempted to be used for such purpose. The apparatus and tooling employed is intended to utilize much existing technology to avoid radical experimentation, but to require less power yet operate more effectively than other systems of its type. It must also be easy to use by utility workers who will normally replace such pipelines.

A guiding concept of the presently proposed technique is the belief that the best way to burst a steel pipeline is to split the pipe on only one line of cut along its length, and to then expand the pipe by spreading it apart along the line of cut, pushing the pipe wall laterally outwardly into the surrounding soil. Preferably, the line of cut will be made along the bottom of the length of pipe. The advantages of this approach include:

(1) The split pipe will remain as a single, arch-shaped piece and will resist soil rebound better than if it were split into more than one piece;

(2) The remaining one-piece, laterally spread apart steel pipe will provide a low-faction surface along which the replacement plastic liner pipe or gas pipeline can slide, thus permitting longer distances between the excavations for the necessary launching and receiving pits at either end of the pipe run; and (3) Slitting the pipe along only one line of cut requires less effort, and consequently less energy than slitting it along multiple lines of cut, or otherwise bursting the pipe to be removed.

In addition, the apparatus utilized in so slitting the pipe must be effective to similarly slit through commonly used exterior repair clamps and pipe couplings mounted on the pipe at spaced intervals, as may be encountered along the intended line of cut. Particularly, the method and apparatus must be effective to routinely split apart the somewhat massive Dresser type couplings as will probably be encountered one or more times along any given length of steel gasline to be replaced, even along those in which the pipe sections are more usually welded together. Further, and recognizing that the conventional cone-shaped spreader mounted on the rearward end of the bursting tool is a viable way to spread apart the split pipe and even the Dresser couplings, an object of the invention is to devise a means for overcoming the pitching or nosing-over action of the elongated tool as is found to occur when an elongated bursting tool having a concentrically mounted spreader cone is passed through longer lengths of pipe, which causes its nose to jam against the wall of the pipe and requires increased force to pull the tool on through due to unproductive bending of the pipe wall about a transverse axis.

Further, recognizing that a fixed blade is the least complicated manner of cutting through an object such as a length of steel pipe, but also recognizing that blade shape, blade angle, blade size and its disposition will greatly affect the ease with which the object can be cut, it is intended by the present invention to provide a fixed blade cutter employing the optimum of these aspects of blade technology, as applied to the intended purpose, and to consider the use of cooperating ancillary devices and mounting relationships as will enhance blade action.

Briefly and generally describing the invention in its preferred embodiment, when a length of underground steel gas main piping is to be replaced, a so-called "launching" pit for introducing the pipe bursting apparatus is excavated at one end of the pipe length to be removed, and a "receiving" pit is excavated at the other end of the length to be removed. Since the pipeline probably runs continuously through each of these pits, the sectional length of the pipe within each pit is cut out and removed, thereby providing an open, entrance end of the pipe within the launching pit, and an open, exit end thereof within the receiving pit.

A conventional, hydraulically operated reciprocating wire rope puller is positioned adjacent to the receiving pit, and a wire pulling rope is fed therefrom into the receiving pit and thence into the exit end and all the way through to the entrance end of the pipe length to be removed. The thus fed free end of the wire rope has a connector thereon which is then attached to the forward end of the elongated pipe bursting and spreading tool provided by the invention, so that the latter may be pulled into and through the pipeline using pulling force exerted by the wire rope puller at the receiving pit. A conventional, pneumatically or hydraulically operated impact ram or "mole" is attached to the other or rearward end of the tool, as is the leading end of the plastic liner or replacement pipe which is to be inserted into and fed through the area of the removed pipe as the bursting tool proceeds therethrough. Pulling force of from five to twenty tons is applied by the wire rope puller to pull the bursting and spreading tool through the pipe length to be removed. A fixed blade mounted on the body of the tool thereby slits the pipe length along only a single line of cut, and an eccentrically disposed conically shaped spreader portion at the rearward end of the tool causes an outward spreading apart of the slit pipe as the work proceeds. The curing action is preferably enhanced by the action of a single roller type pipe slitter mounted in fixed position on the forward end of the tool in longitudinal alignment with the fixed blade, which slits partly through and thereby grooves and weakens the pipe thickness in advance of the fixed blade cutting action. As one or more Dresser couplings or clamps are encountered at locations along the length of pipe being removed, the impact mole is actuated to augment the wire rope pulling action, and force the fixed blade therethrough. The impact mole may also be actuated while only the pipe wall is being slit, if necessary.

The roller slitter on the bursting tool is preferably spaced a sufficient distance in advance of the fixed blade such that the roller slitter will have performed its function of grooving and thereby weakening all of that portion of the pipe length passing through, and reinforced by the Dresser coupling by the time when the fixed blade first encounters the Dresser coupling to cut therethrough. Because it will require very little power to force the fixed blade through the weakened pipe length beneath the Dresser coupling, virtually all of the power exerted by the fixed blade, due to its being pulled and rammed, will be utilized in forcing it through the structure of the Dresser coupling itself, thus reducing total peak power requirements for this purpose.

In addition, the eccentrically disposed conical spreader is spaced a distance behind the fixed knife blade such that, considering its cone angle and the amount of lateral spreading apart which it will thereby induce in the slit pipe, the spreader will also significantly assist the cutting action of the knife blade by generating increased hoop tension immediately in front of the blade cutting edge.

Moreover, the manner in which the eccentricity of the conical spreader portion of the pipe bursting tool is preferably established with respect to the forwardly extending cylindrical body portion on which the fixed knife blade and roller slitter are mounted, is such as to provide a flat or straight longitudinal edge all along the length of the tool which is circumferentially opposite to the blade and slitter, including that beneath the conical spreader itself, which avoids the referred to nosing over or pitching of the tool and consequent transverse bending of the pipe wall as is found to occur when using concentrically arranged conical spreaders.

The preferred fixed blade is comparatively thin and is disposed at an angle of between twenty degrees (20°) and thirty degrees (30°), preferably twenty-five degrees (25°), from the longitudinal axis in the rearward direction of the bursting tool. The included angle of the conical spreader portion of the tool is from ten to twenty degrees (10° to 20°), preferably fifteen degrees (15°). The narrow end of the cone faces forwardly, and one of its conical surface generating side elements is aligned with, and forms a straight continuation of one of the cylindrical surface generating side elements of the forward end portion of the tool on the side thereof which is circumferentially opposite that on which the fixed blade and roller slitter are mounted.

These and other objects, features and advantages will be more fully understood from the following detailed description of the invention, when taken with reference to the accompanying drawings in which:

FIG. 6 is a perspective view, to an enlarged scale, of a preferred blade member which is mounted on the pipe bursting tool illustrated in FIGS. 2–5;

FIG. 7 is a similar perspective view of an alternative blade member as might be mounted on the pipe bursting tool;

FIG. 8 is an end view in cross-section of a pipe bursting tool incorporating the alternative blade of FIG. 7, and showing its operation in bursting a pipe;

FIG. 9 is an exploded view in perspective, to a similarly enlarged scale, of the rotary pipe slitter which is mounted on the pipe bursting tool illustrated in FIGS. 2–5;

Figure 1:
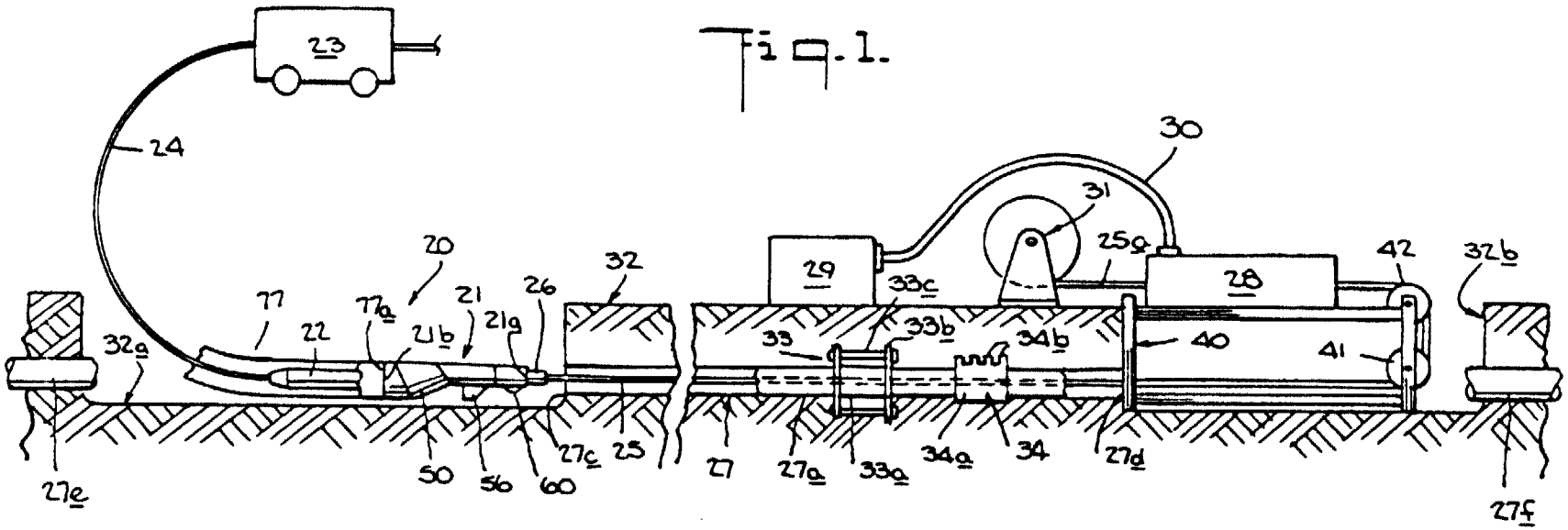
FIG. 1 is a diagrammatic and fragmentary sectional side view illustrating the use of the apparatus and the method of the invention.

Referring to FIG. 1, a pipe bursting and replacement apparatus in accordance with a preferred embodiment of the invention is generally indicated by reference numeral 20 and includes a pipe bursting tool, generally indicated by reference numeral 21, and an impact boring ram 22 (sometimes referred to in the trade as an "impact mole") removably connected to the rearward end 21a of the tool 21 and driven pneumatically by the compressed air supply 23 via the pneumatic air line 24. A wire rope pulling line 25 is removably connected via a coupling 26 to the forward end 21b of the tool 21 for pulling the pipe bursting tool 21 through the length of underground pipe 27 which is to be effectively, though not actually removed in situ, in the manner to be described. Typically the length of pipe 27 to be removed will be several hundred feet long, depending upon factors not relevant to this disclosure. Pulling force on the order of from 5 to 40 tons is exerted on the pulling line 25 by a conventional type of wire rope puller, such as the reciprocating cable puller 28 which, in the preferred embodiment, is actually a modified rod pusher made by Powerram Corp. The puller 28 is hydraulically driven by the hydraulic pump 29 via the hydraulic fluid lines 30. As the wire rope 25 is progressively drawn through the puller 28 its emerging portion 25a, which is no longer under tension, is wound on to the drum 31.

An alternative method for pulling the tool 21 through the pipe 27 could utilize a standard rod pusher such as the aforementioned unit by Powerram Corp., or its equivalent. In this instance the rod pusher would be located co-linearly with the pipe 27 and the wire rope 25 would be supplanted by solid or hollow steel rods which are standard with such rod pushers. Of course, the reciprocating rod pusher would operate in the pushing, rather than the pulling mode, utilizing the reversible feature found on most such units.

In the embodiment of the invention being described the pipe 27 to be removed is a horizontally extending 4" diameter steel pipeline which is buried beneath the ground level 32, usually under a street or roadway (not shown), which is used as a gas main for supplying natural gas from a public utility to homes, factories or other distribution points. The wall thickness of such typical 4" steel pipe is 0.237". Either when initially laid or during a previous repair, the 20' long or 40' long steel pipe sections 27a, 27b (only two of which are illustrated) which make up its length may have been joined using a conventional, exterior mounted pipe joint or coupling 33 which, in the illustrated embodiment, is a standard Dresser pipe coupling. As is well known, the Dresser type pipe coupling includes a closely fitting sleeve or cylindrical ring 33a which peripherally surrounds the loosely abutted ends of the pipe section 27a, 27b, with a plain or armored gasket material (not shown) being disposed at each end of the ring 33a and forming seals between the ring ends and the respective exterior surfaces of the pipe sections 27a, 27b. The gasket material is compressed and held in place by the pair of end rings 33b at either end of the coupling 33, these being drawn together by a plurality of peripherally disposed bolts 33c, all as is well known. For a typical, nominally 4" diameter steel pipe whose actual outside diameter is 4.5", the length of the middle ting 33a is typically 5" or 7" and its thickness is 0.188". The diameters of the respective end rings 33b, which are also made of mild steel, is 8¾", and their greatest ring thickness adjacent the gasket material is about ⅜". These Dresser couplings are available in various sizes for use on steel pipe sizes of 2" through 12" diameter, and their lengths and other dimensions are correspondingly greater or less for larger or smaller pipe. Thus, these exteriorly mounted pipe couplings present formidable obstacles to the intended bursting apart of the entire length of the pipe 27, because the couplings 33 must be similarly split apart by the pipe bursting tool as it moves therethrough.

Similarly, where previous repairs to the pipe 27 have been made, it may be anticipated that elongated pipe clamps 34, each having been installed for sealing a pipe leak or for strengthening an otherwise weakened point, may be found at various locations along the pipe length 27. As is well known, each pipe clamp 34 is formed peripherally around the pipe using a peripherally extending rubber gasket, a stainless steel bridge strap, and a stainless steel outer peripherally extending band 34a whose ends are drawn together as a hoop by a plurality of longitudinally disposed rails and transversely extending bolts 34b. These, too, present formidable obstacles to the passage of the pipe bursting tool along the entire length of the pipe 27, as is intended.

When a gas main such as the length of steel pipe 27 has deteriorated in general condition over the years to an extent where it must be replaced, it is unnecessary to trench and excavate the ground 32 along its length to reach and actually remove all of the pipe length 27 from the ground and replace it. Rather, it is only necessary to split or burst the pipe length 27 apart and expand it radially to press its severed parts into the surrounding soil so as to create a pipe tunnel of enlarged diameter (not illustrated) into which replacement piping, of the same or larger diameter as that of the removed piping, may be inserted and connected. In general, such manner of pipe replacement is known as "pipe bursting and insertion".

To remove and replace the length of pipe 27 in this manner requires excavation to reach and expose the pipe at each end of the length to be replaced. Thus, with reference to FIG. 1, a launching pit 32a is excavated to expose an entrance end 27c of the pipe 27, and a receiving pit 32b is excavated to expose the other, exit end 27d of the pipe length 27 to be replaced. The launching pit is made long enough, say about 10' feet long, to accomodate the connected lengths of the bursting tool 21 (about 2' long) and its connected impact ram 22 (about 5' long) which will be pulled into the entrance end 27c of the pipe 27. The receiving pit 32b is made as small as is convenient for working to disassemble and remove the bursting tool 21 and impact ram 22 as they emerge from the exit end 27d of the pipe length 27. Although the wire rope puller 28 might be set within the receiving pit 32b in alignment with the pipe 27 to exert direct pull on the wire rope 15, in the illustrated preferred embodiment a metal support frame 40 is erected within the receiving pit 32b, having wire rope pulleys 41, 42 mounted thereon as shown, to guide the wire rope 25 out from the receiving pit 32b and into the wire rope puller 28 which is mounted atop the framework 40.

Of course, as will be understood, when the launching pit 32a and receiving pit 32b are formed, an exposed section of the pipe 27 (not shown) as would otherwise extend through each of them must be cut out from the pipe 27 and removed, to form the exposed entrance and exit ends 27c, 27d of the pipe within the respective pits. Thus, severed continuations 27e and 27f of the pipe 27 are illustrated as exposed at the opposite ends of the respective pits 32a, 32b.

Referring now to FIGS. 2–5, the pipe bursting tool 21 of the invention is a tool for longitudinally and laterally expanding the length of underground pipe 27 which is thus to be effectively removed. The leading end 77a of the plastic replacement pipe 77 is connected to the rearward end 21b of the tool so as to be thereby pulled into the split and enlarged pipe 27, so that the pipe 27 will be replaced in situ. The tool 21 has a cylindrical portion 45, formed by the fixed cylindrical portion 45a and the cylindrical portion 45b. The portion 45b may be integrally formed with the portion 45a or, preferably, is removably connected, as shown, in tandem alignment with the fixed cylindrical portion 45a. In the embodiment shown the connection is made using the end of the portion 45a, generally indicated by reference numeral 46.

The diameter of the cylindrical portion 45 is slightly smaller than the inside diameter of the pipe 27 within which it will be received. For example, the inside diameter of a typical 4" steel pipe presently being described is 4.026" and, therefore, the outside diameter of the cylindrical portion 45 would be made about 3.75". In this regard, it should be noted that a ⅛" thick hardened steel skid plate 47, welded on to the underside of the tool 21, including a portion 47a along the removable cylindrical portion 45b, locally increases the effective diameter of the forwardly projecting cylindrical portion 45, as will be understood.

The forward end of the removable cylindrical portion 45b has a threaded end 48 to which the correspondingly threaded wire terminator 26 is coupled by cylindrical connector 49 for removable attachment of the wire pull rope 25, as shown. The threaded end 48 is preferably sized and threaded identically to the size and threading of the threaded end 46 so that, when the cylindrical portion 45b is unscrewed and removed from the threaded end 46, the wire rope connector 49 may be threadedly connected to the end 46, for reasons which will be explained.

Figure 2:
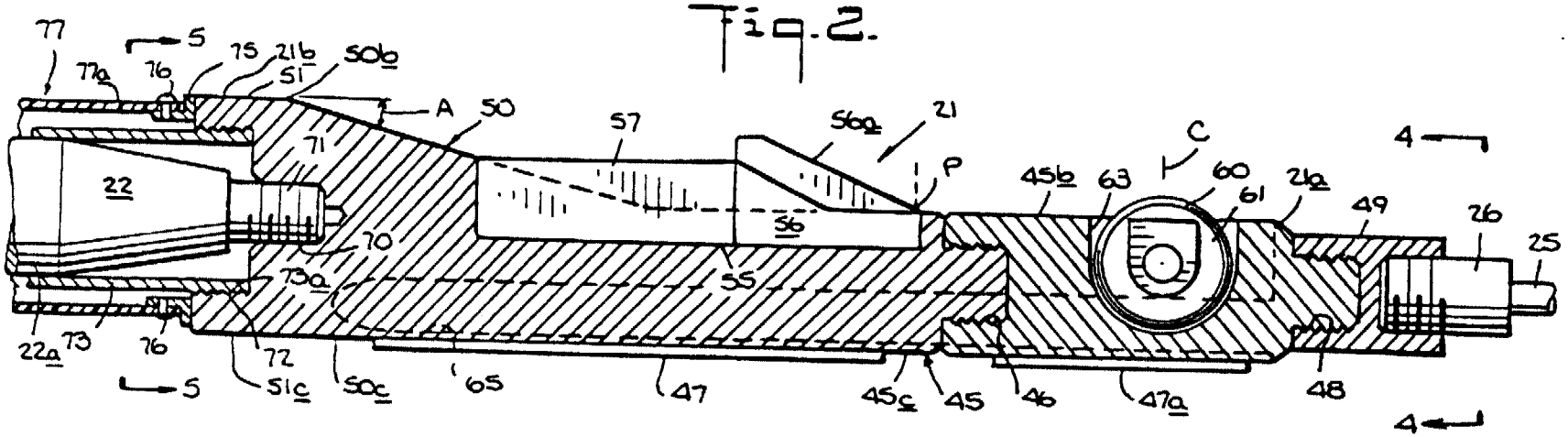
FIG. 2 is a fragmentary sectional side view of the pipe bursting tool and other apparatus of the invention as are connected thereto.
Figure 3:
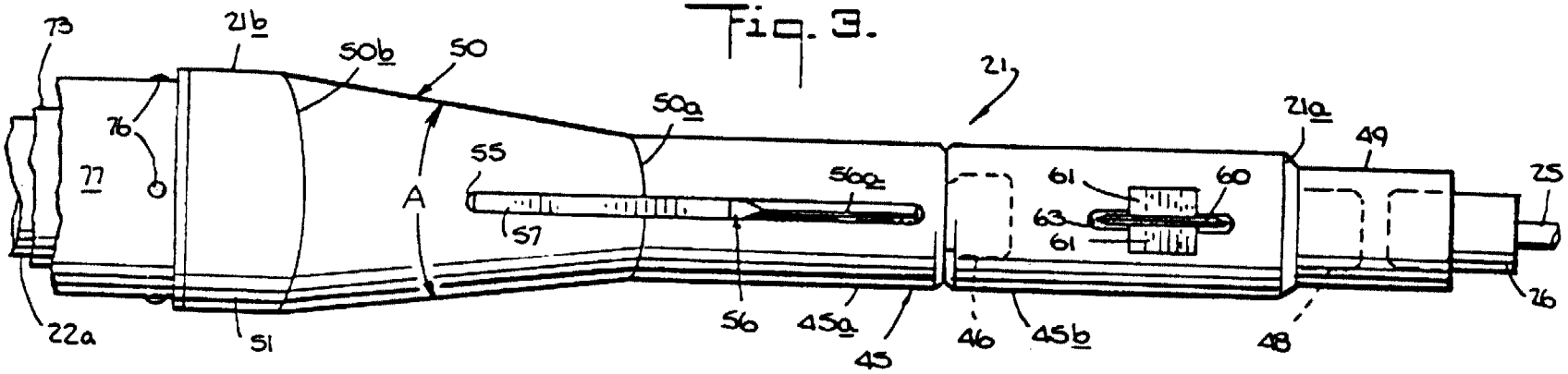
FIG. 3 is a top plan view of the apparatus shown in FIG. 2.

Extending toward the rearward end 21b of the tool 21 from its welded, conjoining attachment along line 50a to the fixed cylindrical portion 45a as seen in FIG. 3 is an eccentrically disposed, conically shaped spreader portion 50 of the tool 21, for laterally spreading apart and thereby expanding the burst pipe 27 as will be described. In the preferred embodiment being described, the portion 50 has right circular truncated conical shape, its narrower, truncated apex end 50a conjoining with and being welded to, or formed with (if cast or fully machined) the rearward end of the fixed cylindrical portion 45a, and its base end 50b being attached as by welding, or otherwise formed in conjoining relation with a short-length cylindrical rearward end portion 51 which extends to the rearward end 21b of the tool 21. The diameter of the enlarged cylindrical portion 51 in the presently described embodiment for 4" pipe is 6[]½". The conically shaped spreader portion 50 has an included cone angle A of from ten degrees (10°) to twenty degrees (20°), preferably fifteen degrees (15°) as shown in FIG. 2 or FIG. 3. One of its conical, surface-generating side elements 50c (FIG. 2) is longitudinally aligned with, and forms a rearward extension of a cylindrical surface-generating side element 45c (also FIG. 2) of the fixed cylindrical portion 45a on one side of the tool 21 as shown, so that that side of the tool, to which the skid 47 is attached, is continuously straight therealong. Thus, on the opposite *side* of the tool as seen in FIG. 2, the conical surface-generating side element of the spreader portion 50 is disposed at an angle, with respect to the longitudinally extending cylindrical portion 45, which is equal to the included cone angle A, since the shape of the conical spreader portion 50 is that of a right circular cone.

In a like manner, one of the cylindrical surface-generating side elements 51c of portion 51 is also longitudinally aligned with, and also forms a rearward extension of the aforementioned cylindrical surface-generating side element 45c of the portion 45a. The effect of this continued longitudinal alignment is that the longitudinal axes of fixed cylindrical portions 45a and 51 are parallel to each other but offset, or eccentric, by a distance equal to one half of the difference between the respective diameters of cylindrical portions 45a and 51. The angular disposition of the axis of right circular conical spreader portion 50 provides a smooth transition between body portions 45a and 51, and provides for the alignment of the three respective surface-generating side elements 45c, 50c, and 51c.

It will be appreciated that there are numerous ways in which to configure the conical spreader portion 50 in addition to the right circular conical shape described for the preferred embodiment of FIGS. 2 and 3. It is sufficient that spreader portion 50 form a generally conical transition between the round crossections of fixed cylindrical portions 45a and 51, and that the axes of cylindrical portions 45a and 51 be parallel, and that longitudinal alignment exist along surface-generating side elements as described above.

A longitudinally extending blade slot 55 (FIG. 2) is formed on the same, opposite side of the tool 21 for receiving a fixed knife blade member 56, which is wedged and held in place by a blade back-up piece 57. The blade member 56 has a forwardly facing and rearwardly angled cutting edge 56a for slitting the pipe 27, as will be described. As perhaps best seen in FIG. 6, the rearward angle of the blade member cutting edge 56a with respect to the side surface of the tool 21 from which it projects (FIG. 2) is the angle B, which is from about twenty degrees (20°) to about thirty degrees (30°). In the preferred embodiment being described, the angle B is twenty-five degrees (25°). Although the width W (FIG. 6) of the base portion 56b and of the blade slot 55 (FIGS. 2 and 3) is ½ in the preferred embodiment, the blade thickness T is comparatively thin, e.g. ¼" in the preferred embodiment. The blade height H projects 2" radially outwardly from its associated side surface on the cylindrical portion 45a of the tool 21, and the preferred included angle I (FIG. 6) of the cutting edge 56a itself is forty degrees (40°).

As seen in FIGS. 2 and 3 the fixed blade cutting edge 56a is spaced a distance forwardly away from the conical spreader portion 50. This distance is somewhat critical in that it will determine whether or not, during the action of the spreader portion 50 on the split pipe as will be described, the spreader portion will generate or establish increased hoop tension in the pipe 27 at a location immediately in front of the cutting edge 56a as the latter slits the pipe 27 longitudinally. Such will facilitate the cutting action, as will be explained. For this purpose, it has been found that the distance between the point P on the cutting edge 56a which will initially "bite" or contact the pipe 27 and the location in longitudinal alignment therewith along the line 50a (FIG. 3) of conjoining between the cylindrical portion 45a and the conical portion 50 should be varied depending upon the cone angle of the eccentric spreader. In the preferred embodiment being described wherein the cone angle of spreader portion 50 is fifteen degrees (15°) that distance will be from about one and one-half times to substantially twice the diameter of the pipe 27 to be cut, preferably one and one-half times the pipe diameter.

An alternative flat top blade 59 as might be similarly mounted in fixed position on the tool 21 is illustrated in FIG. 7. Its flat surface 59a has thickness equal to the full width W of the blade member base 56b, preferably ½" as shown, and its blade angle B is the same as that of the previously described embodiment, i.e, from about twenty degrees (20°) to about thirty degrees (30°), preferably twenty-five degrees (25°). Although its cutting action as will be described is somewhat different from that of the thinner, sharpened blade 56a of the previously described embodiment, the flat top blade 59 has advantages of strength, and the fact that it does not dull easily and therefore need not be replaced or sharpened often. Accordingly, it is relatively inexpensive.

Referring again to FIGS. 2 and 3, and also to FIG. 9, the removable cylindrical portion 45b of the tool 21 has a rotary type pipe slitter 60 mounted therein, between respective bearing blocks 61 which are received in the opening 62 formed in the cylindrical portion 45b. The opening 62 is appropriately longitudinally slotted, as at 63, to receive the slitter wheel 60, as best seen in FIG. 9. The rotary pipe slitter 60 is longitudinally aligned with the fixed blade cutting edge 56a when the removable cylindrical portion 45b is secured to the fixed cylindrical portion 45a, as seen in FIG. 3. It projects outwardly from the surface of the cylindrical portion a distance substantially equal to, or slightly greater than the wall thickness of the pipe 27 to be cut plus the clearance distance between the interior of the pipe 27 and the surface of the cylindrical portion 45b when within the pipe 27. The slitter 60 is a standard pipe cutting wheel having a diameter of 2¼" and blade thickness of about ⅛". As are the fixed blades 56 or 59, the slitter 60 is made of hardened steel, hardened to Rockwell "C" 57 so that the material is tough, though not brittle. As is the longitudinal location of the fixed blade 56a with respect to the conical spreader portion 50, the location along the length of the cylindrical portion 45b of the slitter 60 is functionally related to the operation of the tool 21. That is, the axial center C of the slitter 60 is preferably positioned forward of the blade cutting edge point P a distance which is at least equal to the longest length of any pipe coupling 33 or pipe clamp 34 (FIG. 1) which the tool 21 may be expected to encounter when passing through the length of pipe 27, as will be explained. In general, this distance will be at least equal to one and one-half times the diameter of the pipe 27, and may be greater.

The main body of the pipe bursting tool 21, including its spreader portion 50 and fixed cylindrical portion 45a are preferably made by casting A.I.S.I 4140 or 4340 low alloy steel. Alternatively, these parts, as well as the removable cylindrical portion 45b, may be made using machined steel components, welded together and hardening necessary.

Figure 4:
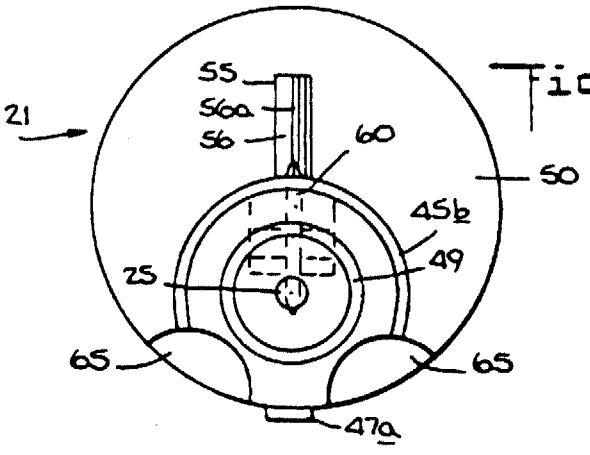
FIG. 4 is a view of the forward end of the apparatus as seen from lines 4—4 in either of FIGS. 2 or 3.

As illustrated in FIGS. 2 and 4, longitudinally extending so-called "junk slots" 65 are formed within the tool body as shown, extending from the forward end 21a rearward at least to a location as seen in FIG. 2 corresponding to about one-half of the length of the conical portion 50. These openings permit longitudinal passage through and beyond the travelling tool 21 of rust, scale and dirt deposits as may have accumulated within the deteriorated pipe 27 being cut, as will be understood. The junk slot function might alternatively be achieved using additional longitudinally extending skids, such as skids 47b and 47c (FIG. 11), or built-up lines of weld along the length of the tool, instead of by grooves as shown. Of course, the circumferential locations of the junk slots, and the number of junk slots provided on the tool may be varied appropriately to suit particular anticipated conditions.

At its rearward end 21b the pipe bursting tool 21 has a threaded aperture 70 for removable connection of the threaded nose rod 71 of the impact ram 22. To provide a more rigid connection between the tool 21 and the impact ram 22 the tool 21 is provided at its rearward end 21b with an additional threaded aperture 72, disposed concentrically with respect to the threaded aperture 70, for receiving a rigid steel ram support pipe 73 at its correspondingly threaded forward end 73a. The inside diameter of the support pipe 73 closely surrounds the cylindrical body 22a of the ram 22 to avoid bending of the latter with respect to tool 21, especially at the threaded nose portion 71.

Figure 5:
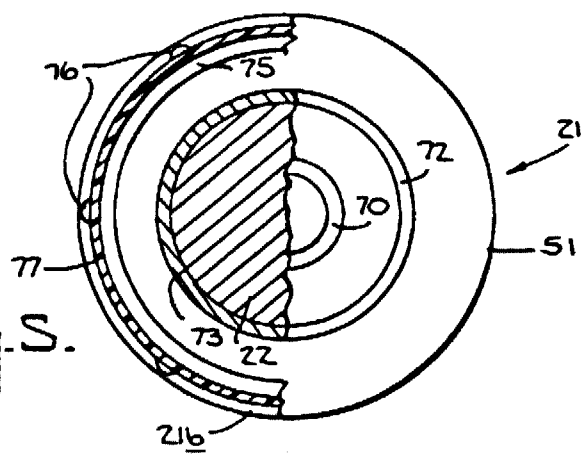
FIG. 5 is a view, partially in section, of the rearward end of the apparatus as seen from lines 5—5 in either of FIGS. 2 or 3.

In addition, a cylindrical pipe receiving flange 75 is attached to the rearward end 21b of the bursting tool 21, as shown in FIGS. 2, 3 and 5, for temporary connection, as by screws 76, of the plastic tubular liner or plastic replacement pipe 77 which the tool 21 will progressively insert into the enlarged pipe tunnel (not shown) which is formed as the tool 21 spreads, and effectively removes the deteriorated underground pipe 27.

The operation of the pipe bursting and inserting tool and ancillary apparatus will now be described particularly with reference to FIGS. 1, 10 and 11.

As will be generally understood from FIG. 1, after the launching pit 32a and receiving pit 32b have been excavated and the frame 40 and wire rope puller 28 are positioned as shown, the wire rope 25 is fed off from the winding drum 31 through the rope puller 38, around the pulleys 42, 41, and then into the exit end 27d of the pipe 27 to be removed. The wire rope and its free end connector 26 are fed or "fished" in any known manner through the pipe 27 to emerge from the entrance opening 27c within the launching pit 32a. The connector 26 is then threadedly connected to the threaded nose 48 of the tool 21, using the cylindrical threaded connector 49 (FIG. 2). The impact ram 22 and pipe liner or replacement piping 77 are attached to the rearward end 21b of the tool 21, and pneumatic power from the compressed air supply 23 is connected to the ram 22.

The hydraulic pump 29 is then activated to operate the wire rope puller 28 to exert pulling force on the wire rope 25, whereupon the tool forward end 21a is guided into the pipe 27 at its entrance end 27c. Although the tool 21 may be oriented in any circumferential or "roll" position as, for example, with its cutting blade 56 and slitter 60 facing upwardly as seen in FIG. 10, as it enters the pipe 27 the tool 21 is preferably oriented as illustrated in FIG. 1, with its eccentric spreader portion 50, cutter 56 and slitter 60 facing downwardly so as to slit the pipe 27 along its lowermost longitudinal element. However, for convenience of illustration, the operation will be described as it would be conducted with these tool elements facing upwardly as shown in FIG. 10. It will be understood, however, that the cutting action of the tool will be the same regardless of its "roll" orientation.

Figure 11:
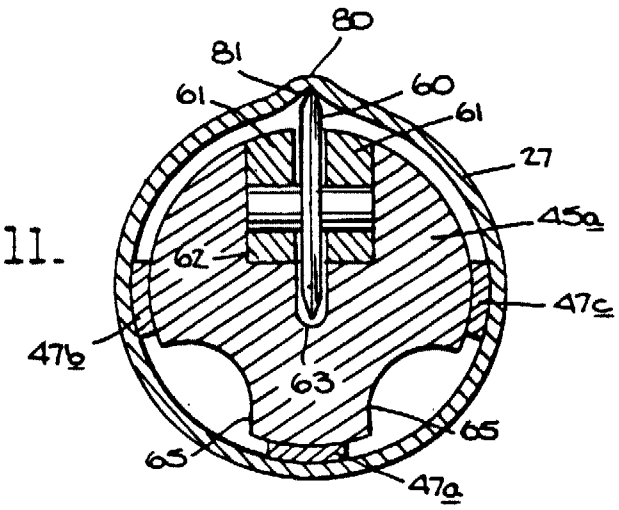
FIG. 11 is a transverse sectional view, as seen from lines 11—11 in FIG. 10, showing in detail the operation of the roller pipe slitter on the pipe bursting tool[.] *; and*

As the pulling force exerted by the rope puller 28 on the wire rope 23 is increased to between 5 and 40 tons, the rotary slitter 60, which first engages the pipe 27 will not likely cut through, but will be found to squeeze the pipe upwardly along the longitudinal line of cut 80 as seen in FIG. 11, and to form a groove 81 along the interior pipe surface element immediately below the line of cut 80, as also indicated in FIG. 11. Backing force for the action of the slitter wheel 60 and the action of blade 56 is provided by the sliding engagement of the skid 47 and 47a with the opposite interior surface of the pipe 27, as also seen in FIG. 11. It will be found that this grooving action of the rotary pipe slitter 60 is continuous along the length of the pipe 27 during the slitting and spreading action of the tool 21.

Figure 12:
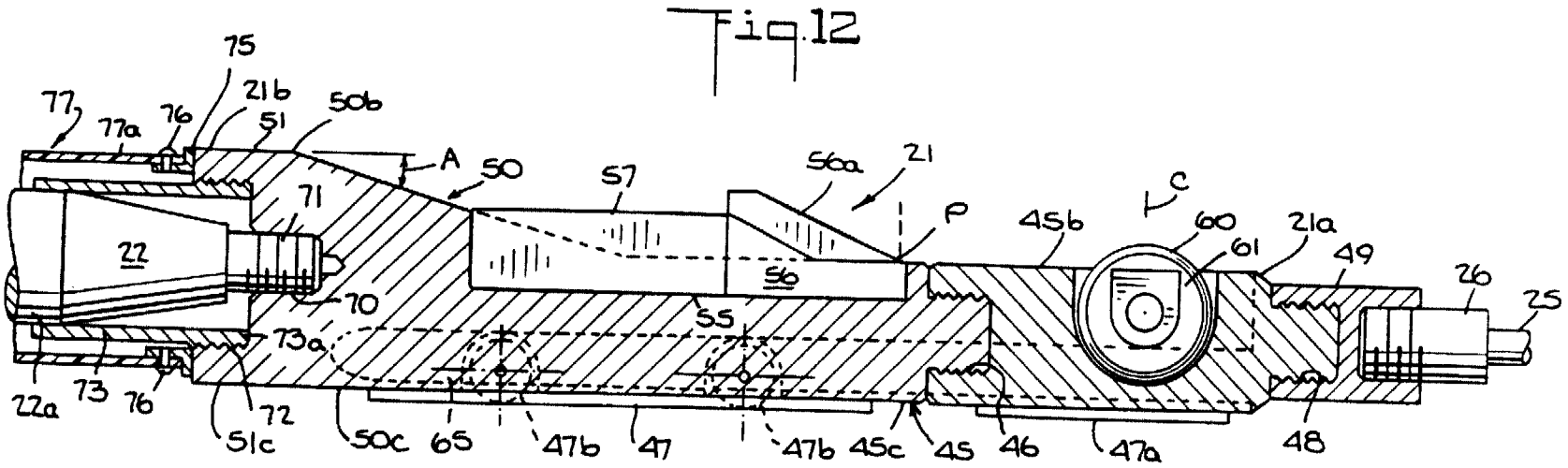
*FIG. 12 is a fragmentary sectional side view similar to FIG. 2, to illustrate a modification of the invention.*

Those skilled in the art will appreciate that it is possible to replace sliding skid 47 with one or more rolling idler elements or wheels [(not shown)] *as illustrated by dotted line showing 47b in FIG. 12*. These idler wheels would also provide the backing force for the action of slitter wheel 60 and blade 56, with the added advantage of lower friction but with the disadvantage of increased cost and susceptability to dirt and foreign matter. Likewise, practice of the invention has shown that the addition of auxilliary skids such as 47b and 47c (FIG. 11) can help maintain the pipe crossection in a circular shape, thereby assisting the action of slitter wheel 60.

It will be understood that the forming of the interior groove 81 thins the pipe wall thickness along the line of cut 80 so that the curing action of the knife blade 56a therealong is facilitated, thus requiring less power to pull the knife blade through the pipe 27, and imposing less wear on the fixed blade 56.

Figure 10:
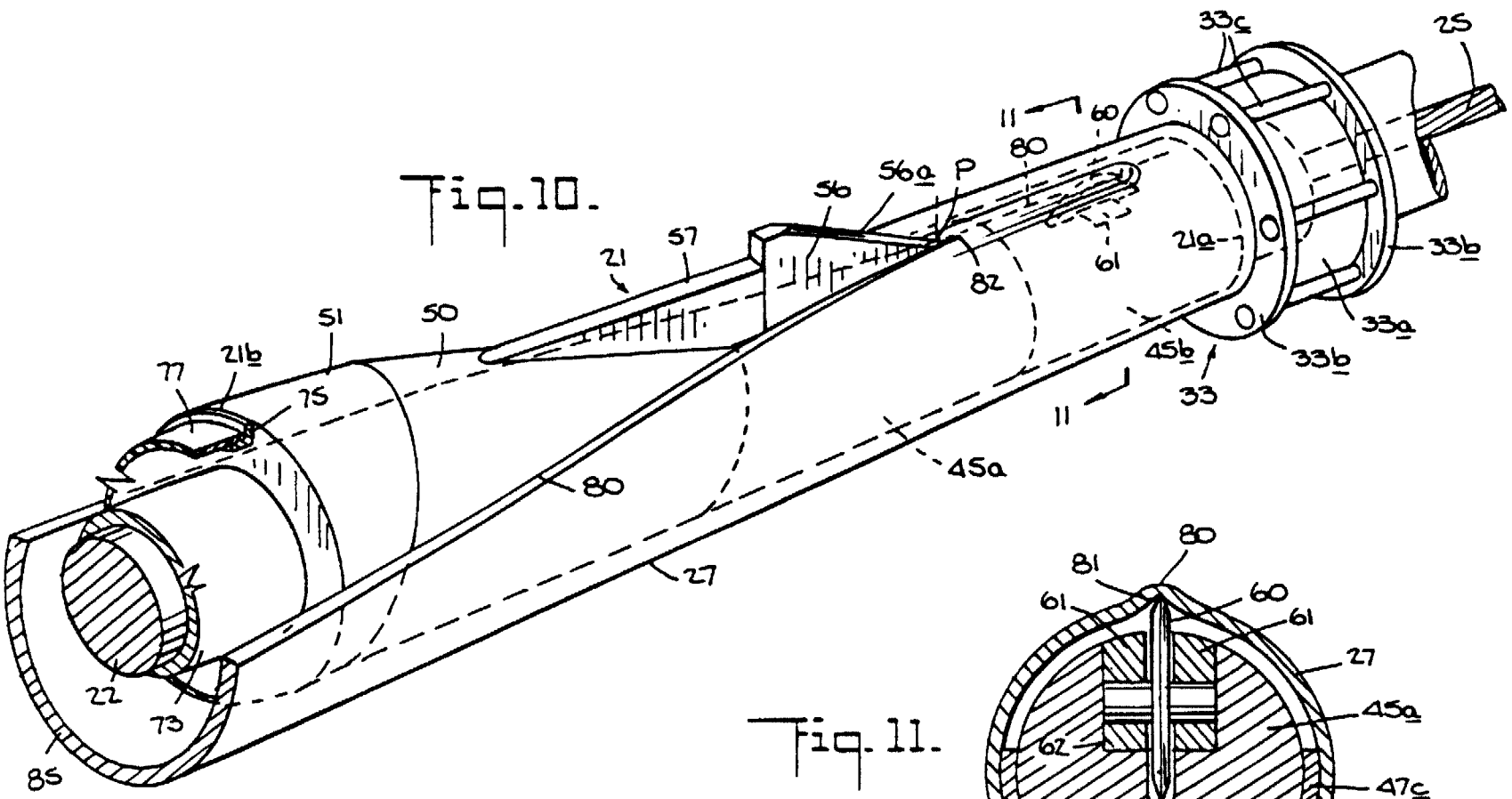
FIG. 10 is a fragmentary perspective view of the apparatus illustrated in FIGS. 2–5, showing its operation in slitting and expanding a length of underground pipe; [and]

Moreover, as will be understood from FIG. 10, the subsequent lateral spreading apart of the slit pipe 27 by the spreader portion 50 of the tool 21 exerts a longitudinal tearing action on the intended line of cut along the as yet unslit pipe, immediately forward of the blade cutting edge 56a, thereby significantly increasing hoop tension within the pipe 27 at that point, which further facilitates the cutting action. As previously noted, this establishment of hoop tension immediately in front of the fixed cutting blade is determined by the positioning of the blade at a fixed distance forwardly of the tool spreader portion 50, considering the conical shape of the spreader portion. That is, if the fixed knife blade 56 is located too far forwardly, the spreader portion 50 will have no effect on the pipe immediately forward of the cutting blade, and the action of the fixed blade will not benefit from the tension. If the knife blade 56 is positioned too far rearwardly, the hoop tension induced by the spreader portion 50 will tend to be established at a location too far forwardly of the knife blade, in which case slitting of the pipe occurs only because of the tearing action of the spreader portion and not due to any knife blade action at all. In the latter case the ability of the tool to split couplings and clamps is severely compromised or defeated because the tearing action of the spreader portion 50, and hence the forward progress of the entire tool, will likely be halted when the spreading/tearing action encounters the local pipe reinfrocment represented by a coupling or clamp. The optimum tool proportions and blade locations cited herein permit the fixed blade 56 to enter and cut a coupling before the spreading/tearing action (and forward progress) are halted, yet stiff allow the spreading action and resulting hoop tension to facilitate the cutting action of the fixed blade. It becomes apparent that if the cone angle of the spreader is changed, the fixed position of the knife blade should also be changed to a location either farther from or nearer to the spreader. If the cone angle of the spreader is made shallower, the knife blade should be positioned farther in front of the spreader; if the cone angle is made wider, the blade should be moved closer to the spreader. In this regard it will be noted that shallower cone angles impart greater "wedging action", and therefore generally induce greater hoop tension in the pipe for a given rope pulling force. As previously mentioned, it is believed that a spreader cone angle within the range of between ten degrees (10°) and twenty degrees (20°) affords good wedging action, with the preferred angle being fifteen degrees (15°), and that for such shallow cone angles the cutting blade should be positioned at a distance of between one and one-half (1½) and two (2) times the nominal diameter of the pipe 27, forwardly of the truncated apex end 50a of the conical spreader.

Depending upon the soil resistance encountered, supplemental ramming force of the impact ram 22 may or may not be required. That is, in less dense and/or less compacted soil, such as sandy soil, the force exerted by the rope puller 28 may be entirely adequate to pull the pipe burster tool 21 in its cutting action through the wall thickness of the pipe 27. In such instances the removable cylindrical portion 45b and the slitter 60 mounted thereon, may be removed. On the other hand, in dense, or compacted, or hard clay soil as well as in instances in which pipe couplings 33 and clamps 34 may be encountered as aforesaid, the augmenting repeated hammering force of the impact ram 22 may be required to slit the pipe wall. In the presently described embodiment wherein 4" diameter steel pipe is being split a typical impact ram 22 would be a Pierce Airrow PA-4 pneumatic underground piercing tool which exerts 420 blows per minute, each with an impact force of 190 lbs. Other typical Pierce Airrow tools as may be used for up to 6" diameter pipe provide up to 620 blows per minute, with impact forces of from 70 to 190 lbs. Larger rams may be employed for larger pipe sizes.

As noted, the grooving action of the slitter wheel 60 is intended to be performed considerably in advance of the actual slitting apart of the pipe 27. It becomes apparent that such grooving can be performed in an operation which is conducted in advance of and separate from the cutting and bursting action of the fixed blade 56 and conical spreader portion 50. Thus, referring again to FIG. 1, such two-stage operation could be conducted by utilizing an unmodified standard rod pusher (not shown) within the receiving pit 32b, in alignment with the pipe exit end 27d and pushing connected lengths of rod through the pipe 27, with only the removable cylindrical portion 45b (FIG. 2) connected to the leading end of the first length of rod to be introduced into the pipe end 27d. The slitter wheel 60 thereon would be pushed through by the connected rods and would groove the pipe 27 from its exit end 27d to its entrance end 27c, whereupon the cylindrical portion 45b would be detached therefrom within the launching pit 32a, and the forward end of the pipe bursting tool cylindrical portion 45a would be attached to the rod end. The rod pusher would then be reversed so [a] *as* to pull the lengths of rod and the bursting tool back through the pipe 27 to the receiving pit 32b so that the pipe is thereby slit and laterally expanded by its fixed knife blade 56 and its conical spreader portion 50. In this way the more fragile slitter wheel 60 would not be subjected to the pounding delivered by the impact ram 22 if its use is necessary during the slitting and bursting operation. Of course, the same two-stage operation of grooving and then slitting and bursting the pipe could also be performed using two pulling passes with the wire rope 28, the first pulling the detached cylindrical portion 45b with its slitter wheel 60 through the pipe, and the second pass being made with only the fixed cylindrical portion 45a and its conjoining spreader portion 50 to slit and burst the pipe.

Referring again to FIG. 10, using the preferred cone angle of the spreader portion 50 and the preferred position of the blade member 56 as previously described, it will be found that the conical spreader portion 50 induces a small longitudinal tear, indicated by reference numeral 82, immediately in front of the contact point P of the blade cutting edge 56a, so that the force required to move the blade along the line of cut 80, 82 is significantly reduced.

Using the combined pulling action of the wire rope 25 and the hammering action of the impact ram 22, it will be found that the tool 21 easily slits through and spreads apart any pipe coupling 33 or pipe clamp 34 (FIG. 1) as may be encountered along the length of the pipe 27. As previously pointed out, the cutting action of the knife blade 56a and the conical spreader portion 50 through any coupling 33 or pipe clamp 34 is augmented by the grooving 81 and consequent weakening of the pipe wall thickness along the intended line of cut 80 as the slitter 60 passes beneath the end rings 33b and middle ring 33a of the coupling 33 in advance of any contact of the knife blade cutting edge 56a with the coupling or the clamp.

The amount of pulling force required is also significantly reduced by the fact that the tool 21 is required to cut along only a single line of cut 80 through the pipe 27, and by the eccentrically arranged spreader portion 50 whose spreading action is concentrated along that one line of cut and only the adjacent side wall portions of the pipe.

The eccentric disposition of the conical spreader portion 50 as shown and described, and which provides a completely straight reaction edge along its opposite side, additionally prevents pitching or nosing-over movement of the tool 21 as it is pulled and rammed through the pipe 27.

Further, the cutting of the pipe 27 along only one line of cut 80 produces an arch-like expanded shape of the slit pipe, as indicated by reference numeral 85 in FIG. 10, which affords a smooth interior surface along which the plastic liner or replacement pipe 77 may slide as it is inserted, thereby further reducing required forces. The arch-like form 85 of the slit pipe when produced as an inverted U-shape as indicated in FIG. 1, has the additional advantage of shielding the thus produced pipe tunnel from rebound or other entry of dirt from the surrounding compacted soil.

With reference to FIG. 8 it will be noted that, when using the flat top blade 59, the line of cut 80 of the pipe 27 is actually made by only one of the its longitudinal, angularly disposed edges 59c or 59d. Of course, the grooving action of the slitter wheel 60 along the line of cut 80 in advance of the knife 59 reduces the cutting force required by the flat top cutter.

Thus has been described an underground pipe bursting tool, an apparatus, and a method which achieve all of the objects of the invention.

What is claimed is:

1. A pipe bursting tool for longitudinally slitting and laterally expanding a length of steel pipe, said tool having a forward end and a rearward end, comprising a substantially cylindrical portion including said forward end and whose diameter is smaller than the inner diameter of said pipe so as to be received therein, a truncated substantially conical spreader portion for laterally expanding said pipe and having a truncated apex end conjoining with said cylindrical portion and a base end adjacent to said rearward end of said tool which is substantially larger than said inner diameter of said pipe, said spreader portion having a conical surface-generating side element aligned with and forming a rearward extension of a cylindrical surface-generating side element of said cylindrical portion and together providing a straight side surface of said tool, said conical spreader portion thereby being eccentrically disposed with respect to the longitudinal axis of said cylindrical portion, and a fixed blade member mounted on and projecting outwardly from a second surface of said tool which is opposite to its said straight side surface, said blade member having an angularly rearward extending and forwardly facing cutting edge.

2. A tool according to claim 1, wherein said blade member is mounted on said cylindrical portion at a location whereby its said cutting edge at a point adjacent to said second surface is spaced a distance forwardly away from the location of said conjoining between said cylindrical portion and said apex end of said conical spreader portion.

3. A tool according to claim 2, wherein said conical spreader portion has a predetermined included cone angle, and said distance is determined with respect to said included cone angle whereby, when said spreader laterally expands said pipe, said conical spreader portion exerts tearing action on said pipe at a location immediately forward of said point on said cutting edge.

4. A tool according to claim 2, wherein said distance is within the range of from substantially one and one-half times to substantially twice the diameter of said underground pipe.

5. A tool recording to claim 4, wherein said conical spreader portion has an included cone angle which is within the range of from substantially ten degrees (10°) to substantially twenty degrees (20°).

6. A tool according to claim 5, wherein said distance is substantially one and one-half times said diameter, and said included cone angle is substantially fifteen degrees (15°).

7. A tool according to claim 2, which further comprises a rotary pipe slitter mounted on and projecting outwardly from said cylindrical portion in longitudinal alignment with said blade member along said second surface and spaced a second distance forwardly away from said point on said blade member cutting edge.

8. A tool according to claim 7, wherein said second distance is greater than substantially one and one-half times the diameter of said underground pipe.

9. A tool according to claim 7, wherein said tool cylindrical portion comprises a fixed portion extending forwardly from said conjoining location, said blade member being mounted on said fixed portion, a removable portion extending forwardly of said fixed portion, said rotary slitter being mounted on said removable portion, and connection means removably connecting said removable portion to said fixed portion.

10. A tool according to claim 1, wherein said blade member cutting edge extends rearwardly at an angle which is within the range of from substantially twenty degrees (20°) to substantially thirty degrees (30°) with respect to said second surface of said tool.

11. A tool according to claim 10, wherein said angle is substantially twenty-five degrees (25°).

12. A tool according to claim 1, wherein said conical spreader portion has an included cone angle of substantially fifteen degrees (15°), said blade member cutting edge extends rearwardly at an angle of substantially twenty-five degrees (25°), said blade member is mounted on said cylindrical portion at a location whereby its said cutting edge at a point adjacent to said second surface is spaced a distance of substantially one and one-half times the diameter of said underground pipe forwardly away from the location of said conjoining between said cylindrical portion and said apex end of said conical spreader portion, and which further comprises a rotary pipe slitter mounted on said cylindrical portion in longitudinal alignment with said blade member along said second surface and spaced a distance which is greater than substantially one and one-half times the diameter of said underground pipe forwardly away from said point on said blade member cutting edge.

13. A tool according to claim 1, which further comprises means defining a plurality of circumferentially spaced apart, longitudinally disposed junk slots extending along the length of said cylindrical portion from its said forward end and continuing at least a substantial distance along the length of said spreader portion.

14. A tool according to claim 1, which further comprises a rearward end cylindrical portion conjoining at its forward end with, and having diameter substantially equal to the diameter of said base end of said conical spreader portion, the longitudinal axis of said rearward end cylindrical portion being parallel with the longitudinal axis of the first said cylindrical portion, and said rearward end cylindrical portion having a cylindrical surface-generating, side element aligned with and forming a rearward extension of said spreader portion conical surface-generating element.

15. Apparatus for longitudinally slitting and laterally expanding a length of underground steel pipe, comprising an elongated pipe bursting tool having a forward end and a rearward end, an elongated pneumatically actuated impact ramming tool connected to and extending in tandem relation rearwardly of said pipe bursting tool, said ramming tool having a longitudinal axis which is parallel to the longitudinal axis of said pipe bursting tool, and connection means on said forward end of said pipe bursting tool for connecting a wire pulling rope thereto, said pipe bursting tool comprising a cylindrical portion including said forward end and whose diameter is smaller than the interior diameter of said pipe so as to be received therein, a truncated substantially conical spreader portion having a truncated apex end conjoining with said cylindrical portion and a base end adjacent to said rearward end of said tool which is substantially larger than said inner diameter of said pipe, said conical portion being eccentrically disposed with respect to said cylindrical portion, and pipe slitting means mounted on and projecting outwardly from said pipe bursting tool.

16. Apparatus according to claim 15, wherein said pipe [splitting] *slitting* means comprises a fixed blade member mounted on and projecting outwardly from said cylindrical portion and having an angularly rearward extending and forwardly facing cutting edge, said cutting edge being spaced a distance forwardly away from the location of said conjoining between said cylindrical portion and said apex end of said conical spreader portion.

17. Apparatus according to claim 16, wherein said pipe has externally attached pipe coupling or clamping means having length extending along a portion thereof, and said pipe [splitting] *slitting* means further comprises a rotary pipe slitter mounted on and projecting outwardly from said cylindrical portion in longitudinal alignment with said blade member along said second surface and spaced a distance greater than said length of said pipe coupling or clamping means forwardly away from a point on said blade member cutting edge adjacent to said second surface.

*18. A tool for longitudinally slitting and laterally expanding a length of steel pipe, said tool having a forward end and a rearward end and comprising a longitudinally extending cutter portion including said forward end of said tool and having opposite longitudinal sides and transverse dimensions smaller than the inner diameter of said pipe so as to be received therein, a pipe cutter mounted on and having a forwardly facing cutting edge projecting outwardly from said cutter portion on one of said sides thereof for slitting said pipe along one line of cut and means on the other of said sides thereof for engaging the interior surface of said pipe, and a spreader portion adjacent to said rearward end of said tool and having a narrow forward end adjacent to said cutter portion, a wider rearward end, and a substantially longitudinal side extending rearwardly between its said forward and rearward ends with respect to said other side of said cutter portion, said spreader portion being disposed eccentrically with respect to the longitudinal axis of said cutter portion in the direction of said one side of said cutter portion with its said narrow forward end disposed whereby, at least adjacent to said forward end it will enter said one line of cut and with its said wider rearward end disposed to follow its said forward end within said line of cut to progressively spread said slit pipe substantially laterally along said one line of cut as said tool is moved in the direction of its said forward end through said slit pipe.*

*19. A tool according to claim 18, wherein said means on the other of said sides of said cutter portion comprises at least one skid plate attached to said cutter portion.*

*20. A tool according to claim 18, wherein said means on the other of said sides of said cutter portion comprises at least one rolling idler element mounted on said cutter portion.*

*21. A tool for longitudinally slitting and laterally expanding a length of pipe, said tool having a forward end and a rearward end and comprising a cutter portion adjacent to said forward end and whose transverse dimensions are smaller than the inner diameter of said pipe so as to be received therein, a pipe cutter mounted on and projecting outward from said cutter portion on one side thereof for slitting said pipe when said tool is moved therethrough in a forward direction, said cutter portion having an opposite longitudinal side, and a spreader portion for laterally expanding said slit pipe and having a forward end connected to said cutter portion which is smaller than the diameter of said pipe to be received therein and a rearward end which is wider than said forward end, said rearward end of said spreader portion being eccentrically disposed with respect to the longitudinal axis of said cutter portion towards said one side thereof, said spreader portion having an opposite side which extends substantially longitudinally and rearwardly between its said forward and rearward ends with respect to said opposite longitudinal side of said cutter portion, and said spreader portion widening in lateral direction between its said forward and rearward ends to engage and spread apart opposite sides of said slit pipe as said tool is moved therethrough in said forward direction.*

* * * * *